(12) United States Patent
Zhou

(10) Patent No.: US 7,559,517 B2
(45) Date of Patent: Jul. 14, 2009

(54) CLAMPING MECHANISM FOR COMPUTER PERIPHERAL DEVICE

(75) Inventor: Bing-Yu Zhou, Taipei (TW)

(73) Assignee: Kye Systems Corp., Taipei (TW)

( * ) Notice: Subject to any disclaimer, the term of this patent is extended or adjusted under 35 U.S.C. 154(b) by 247 days.

(21) Appl. No.: 11/500,962

(22) Filed: Aug. 9, 2006

(65) Prior Publication Data

US 2008/0042040 A1 Feb. 21, 2008

(51) Int. Cl.
*F16B 1/00* (2006.01)
(52) U.S. Cl. .................. 248/229.12; 24/523; 24/524; 248/229.24
(58) Field of Classification Search ............ 348/373, 348/375, 374, 207; 396/421, 419, 428; D16/202; 248/187.1, 126, 346.06, 121, 166, 231.41, 248/229.12, 229.21, 229.14, 227.2, 231.61, 248/229.22, 229.24; 24/522, 523, 524
See application file for complete search history.

(56) References Cited

U.S. PATENT DOCUMENTS

| | | | | |
|---|---|---|---|---|
| 3,262,670 A | * | 7/1966 | Marlett | 251/7 |
| 4,976,721 A | * | 12/1990 | Blasnik et al. | 606/157 |
| 5,689,865 A | * | 11/1997 | Weber, III | 24/523 |
| 5,884,969 A | * | 3/1999 | Gebhard | 297/353 |
| 6,182,484 B1 | * | 2/2001 | Wolter | 70/395 |
| 6,431,507 B2 | * | 8/2002 | Prather et al. | 248/166 |
| 6,663,066 B1 | * | 12/2003 | Hong | 248/231.41 |
| 6,679,463 B1 | * | 1/2004 | Chen | 248/126 |
| D497,930 S | | 11/2004 | Moayer et al. | D16/242 |
| 6,845,954 B1 | * | 1/2005 | Moayer et al. | 248/187.1 |
| D502,956 S | * | 3/2005 | Holmes et al. | D16/242 |
| D511,352 S | | 11/2005 | Oliver et al. | D16/203 |
| 7,093,811 B2 | * | 8/2006 | Wu | 248/229.12 |
| 7,374,351 B2 | * | 5/2008 | Martinez et al. | 396/419 |
| 2006/0127082 A1 | * | 6/2006 | Sitoh et al. | 396/428 |
| 2007/0147829 A1 | * | 6/2007 | Teratani | 396/428 |

* cited by examiner

Primary Examiner—Ramon O Ramirez
(74) Attorney, Agent, or Firm—Bacon & Thomas, PLLC

(57) ABSTRACT

The present invention relates to a clamping mechanism, and in particular to a clamping mechanism for a computer peripheral device. The clamping mechanism includes a base for receiving a resilient button at one side, and a clamp positioned at the other side of the base. The clamp has a first extension extending into the base, and the button is coupled to first extension and therefore to the clamp. The button is resilient and deformable to generate a restoring force such that an object can be clamped between the clamp and the base.

5 Claims, 6 Drawing Sheets

CLAMPING MECHANISM FOR COMPUTER PERIPHERAL DEVICE

BACKGROUND OF THE INVENTION

1. Field of the Invention

The present invention relates to a clamping mechanism, and particularly to a mechanism enabling a computer peripheral device to be clamped to an object.

2. Description of the Prior Art

Because of the advance of electronics, computer peripheral devices are becoming smaller and smaller. For example, microphones, wireless receivers, card readers, and web cams are all much smaller than ever.

There are two ways to position a computer peripheral device near a computer. The first way is to place the computer peripheral device on a desk top, while the second way is to clamp the device on an object, such as a computer screen. However, either way requires a complicated structure, as is apparent from U.S. Pat. No. D511352, U.S. Pat. No. 6,845,954, and U.S. D497930.

Each of the cited patents is directed to a web cam, and each of the web cams includes a camera module and a clamping mechanism. The result of combining the camera modules and clamping mechanisms is a web cam having an unacceptably larger overall size.

SUMMARY OF THE DISCLOSURE

It is an objective of the present invention to provide a clamping mechanism for a computer peripheral device, which has a greatly reduced size.

It is another objective of the present invention to provide a computer peripheral device having a lower cost.

To accomplish the objectives mentioned above, the invention comprises a base for receiving a resilient button at one side, and a clamp positioned at the other side of the base. The clamp has a first extension arranged to extend through the base, such that the button may be coupled to the clamp in order to secure the clamp to the base. The button is resilient and deformable to generate a restoring force and thereby enable an object to be clamped between the clamp and the base.

DETAILED DESCRIPTION OF THE PREFERRED EMBODIMENTS

Figure 1:
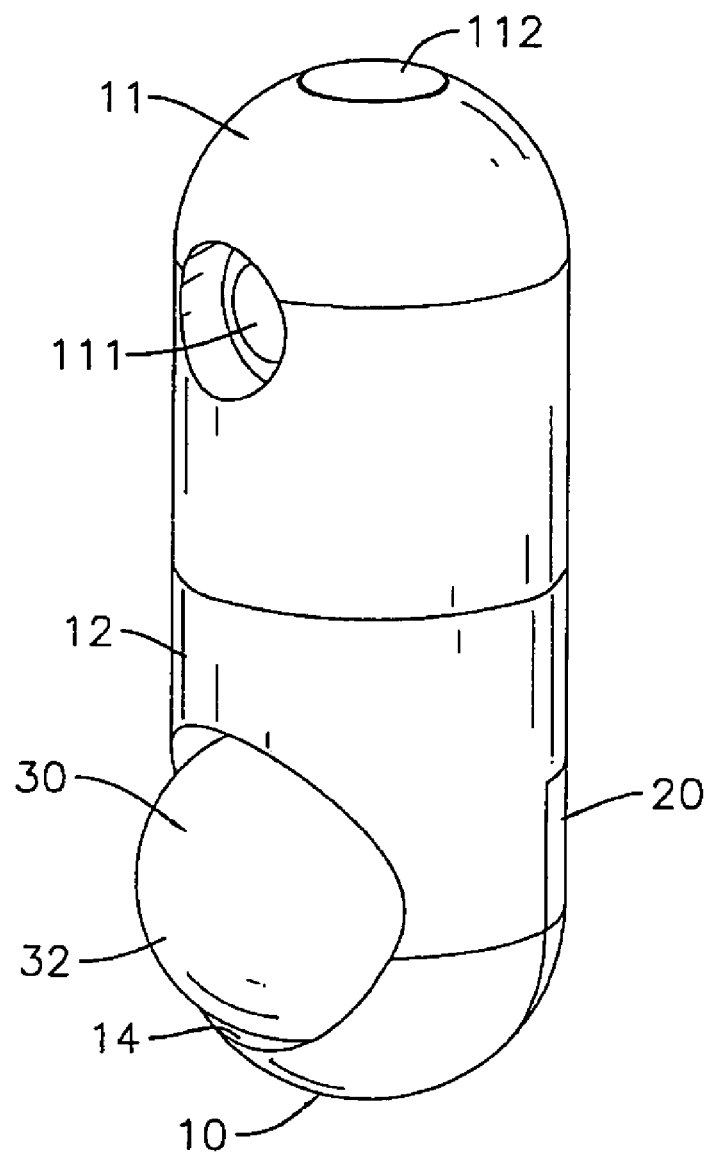
FIG. 1 is a perspective view of a preferred embodiment of the present invention.
Figure 2:
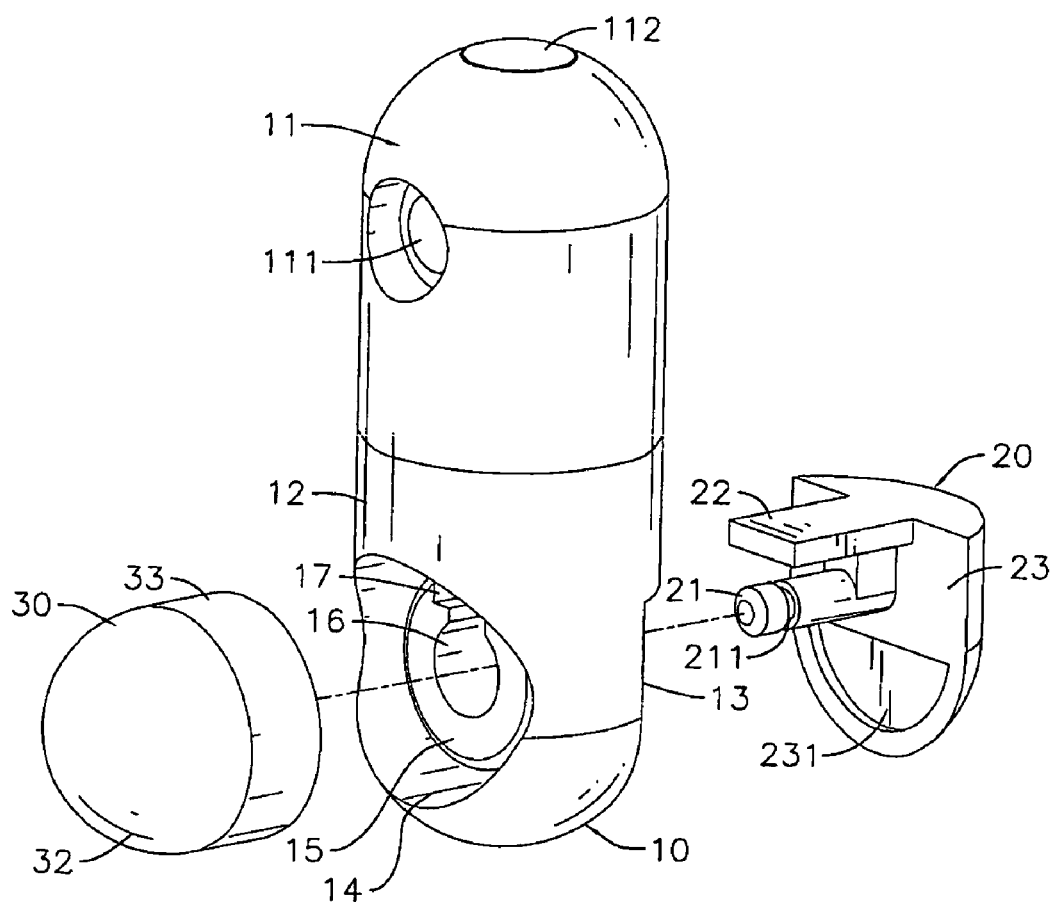
FIG. 2 is a perspective exploded view of the preferred embodiment.
Figure 3:
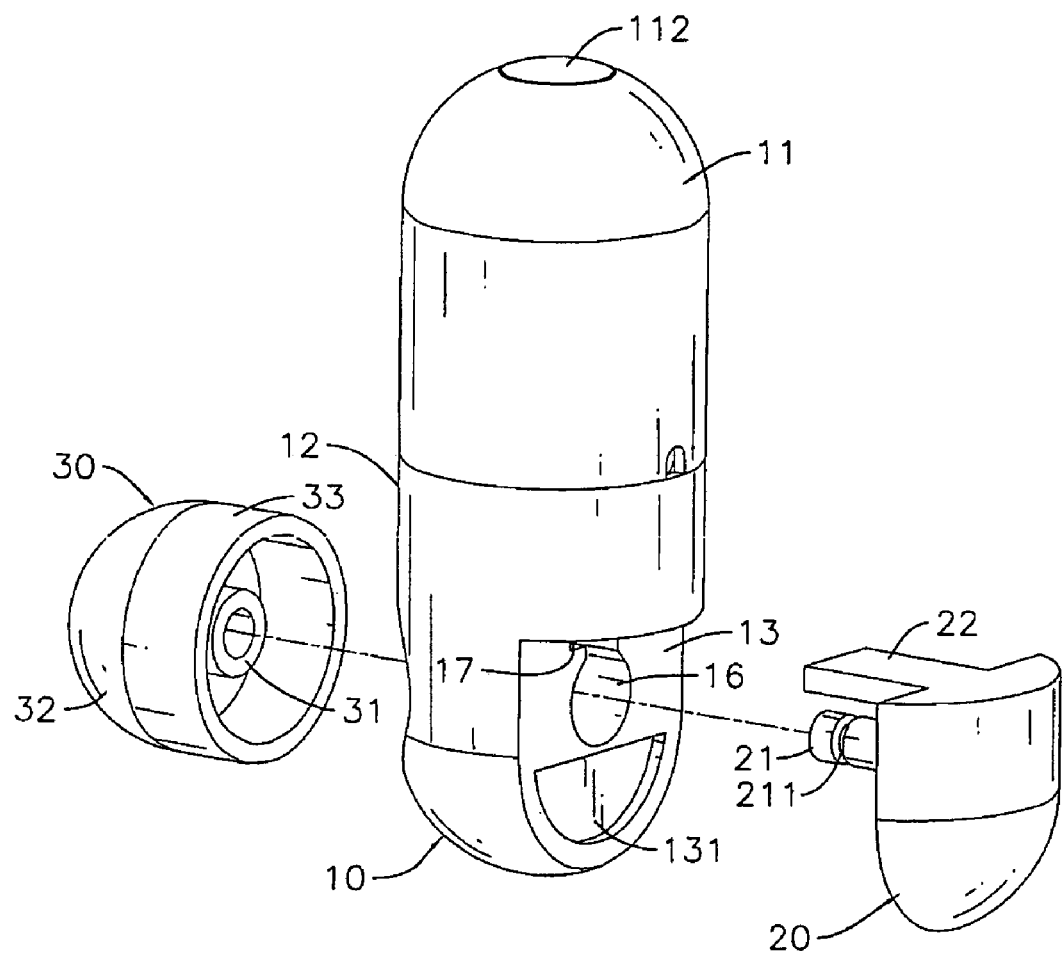
FIG. 3 is another perspective exploded view of the preferred embodiment.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The computer peripheral device described in the invention may include, by way of example and not limitation, a web cam, microphone, card reader, wireless receiver, and/or card reader.

In the embodiment shown in FIGS. 1-4, the computer peripheral device is a web cam that includes a clamping mechanism 10, and a camera section 11. The clamping mechanism 10 further comprises a base 12 coupled to the camera section 11, a button 30 at a side of the base 12, and a clamp 20 at another side of the base 12.

The camera section 11 includes a lens 111, and a switch 112 located on the top of the computer peripheral device for capturing a still image from the lens 111.

The base 12 has a clamping surface 13 at one side for holding an object between the clamp 20 and the clamping surface 13, and a recess 14 at the other side for receiving the button 30. The clamping surface 13 further has an indented portion 131 for receiving a pad. The base 12 further has a driving hole 16 and a guiding opening 17. The recess 14 has an annular raised portion 15 for holding the button 30.

The button 30 has a resilient dome 32 and a relatively rigid skirt 33 arranged such that the skirt 33 may fit over the annular raised portion 15 and the end of the skirt 33 may contact a bottom 141 of the recess 14. The inside of the button 30 has a tube 31 extending from the dome 32, and the inside of the tube 31 has a rib 311. Those skilled in the art will appreciate that even though the dome deforms when pushed while the skirt maintains its shape, the dome 32 and the skirt 33 may be made of the same material due to the progress of materials science.

The clamp 20 has a clamping surface 23 where a post 21 and a guiding plate 22 protrude from the clamping surface toward the clamping surface 13 of the base 12. In addition, the post 21 has a groove 211, and the clamping surface 23 has a pad-receiving indentation 231 which is located at a position corresponding to the pad-receiving indented portion 131.

Figure 4:
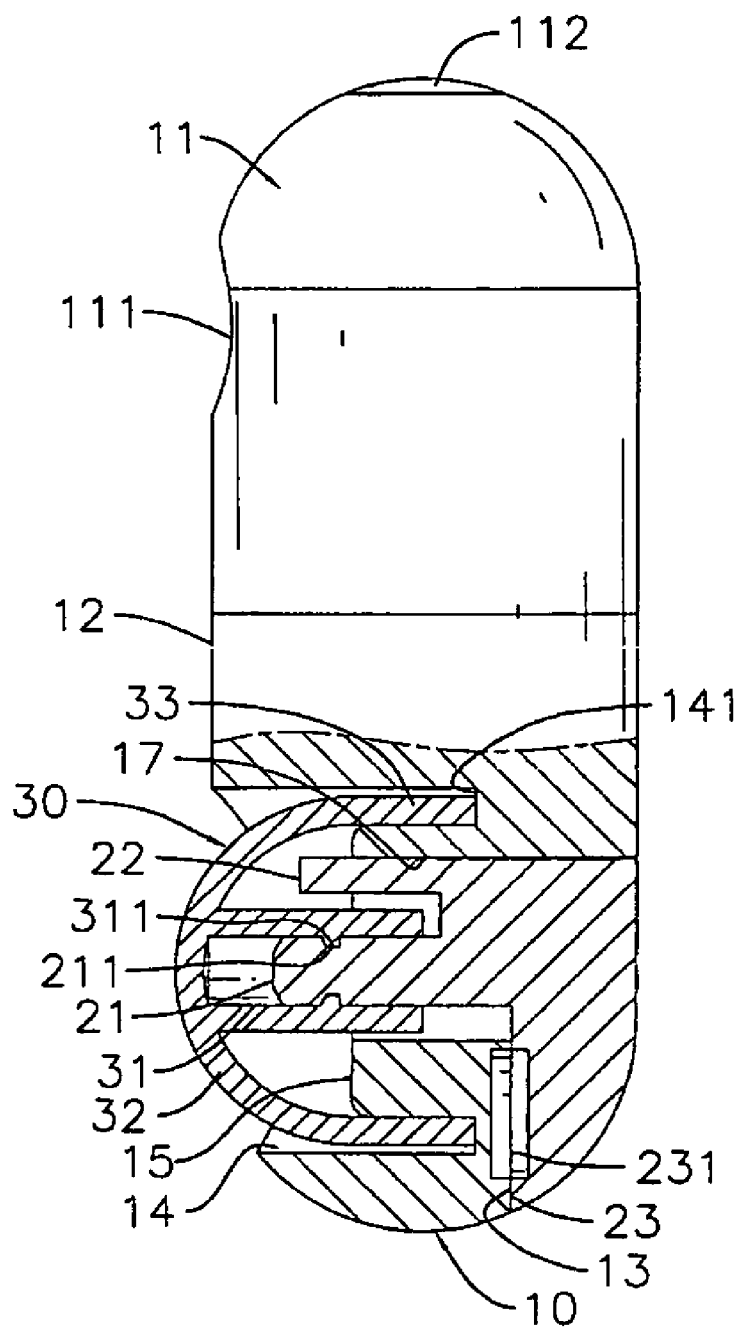
FIG. 4 is a sectional view of the preferred embodiment, in which the clamping mechanism is in a neutral state.

Referring to FIG. 4, when the button 30, the base 12 and the clamp 20 are assembled together, the guiding plate 22 and the post 21 will extend into the guiding opening 17 and the driving hole 16 respectively from the clamping surface 13. In the mean time, the button will be received in the recess 14 and the post 21 will be inserted into the tube 31. Therefore the rib 311 will engage and hold groove 211 such that the post 21 and the tube 31 are firmly coupled together. Due to the restoring force generated by the dome 32, the clamping surface 23 and the clamping surface 13 are pulled firmly towards each other.

Figure 5:
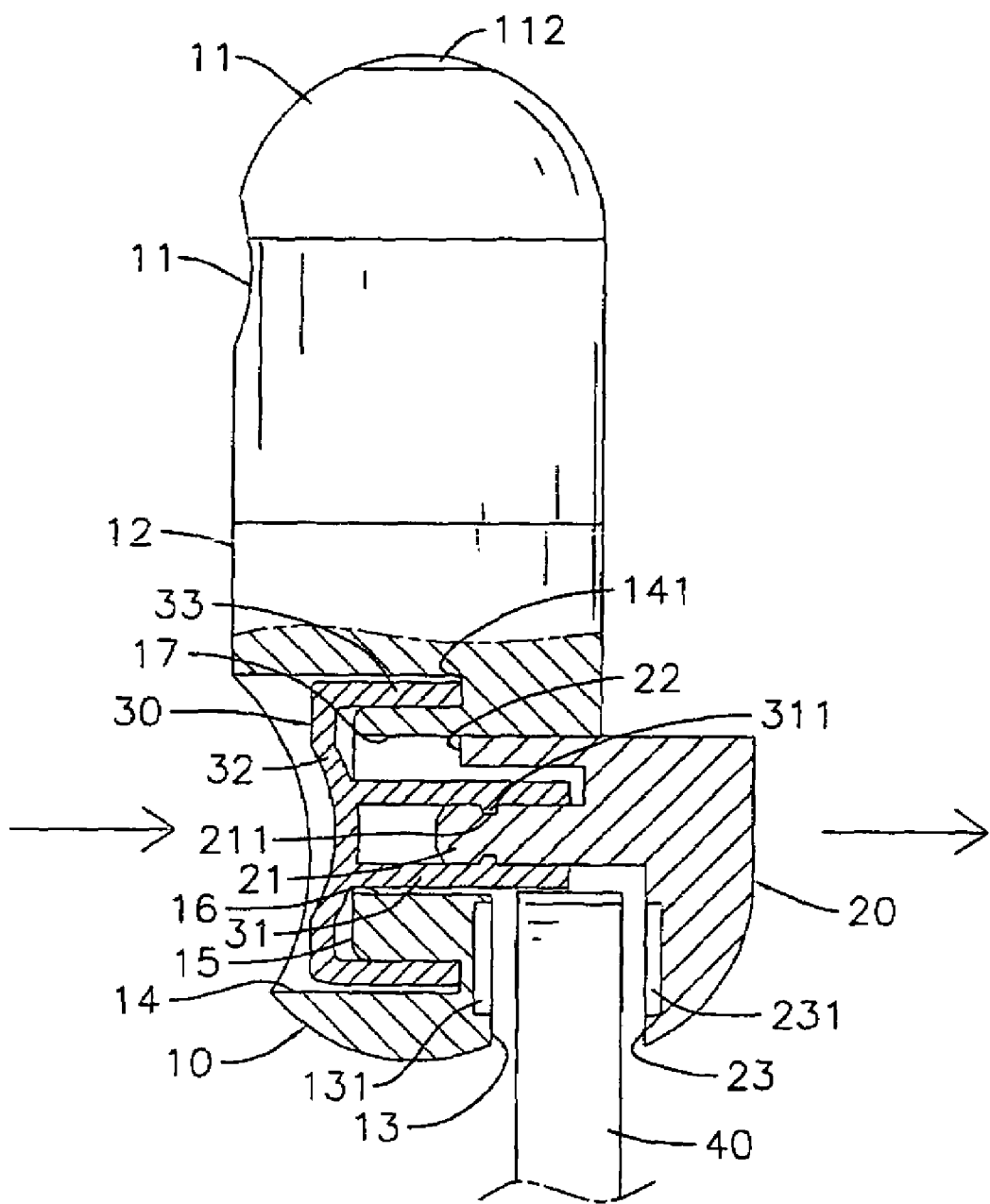
FIG. 5 is a sectional view of the preferred embodiment, in which the clamping mechanism is in a pressing state.

Referring to FIG. 5, once a user presses the button 30 toward the clamp 20, the doom 32 will be deformed as a U-shaped structure. The raised portion 15 and the skirt 33 will support the dome 32 in a steady state while the rib 311 of the tube 31 will push on the groove 211 of post 21 to move the post 21 and clamp 20 relative to the base 12 through the driving hole 16 in a piston movement, at which time the guiding plate 22 will simultaneously move along the guiding opening 17. As a result, the clamp 20 is pushed away from the base 12 by pressing the button 30, causing a clamping space to be present between the clamping surface 13 and the clamping surface 23, into which an object 40 or a computer display may be inserted, as shown in FIG. 5.

Figure 6:
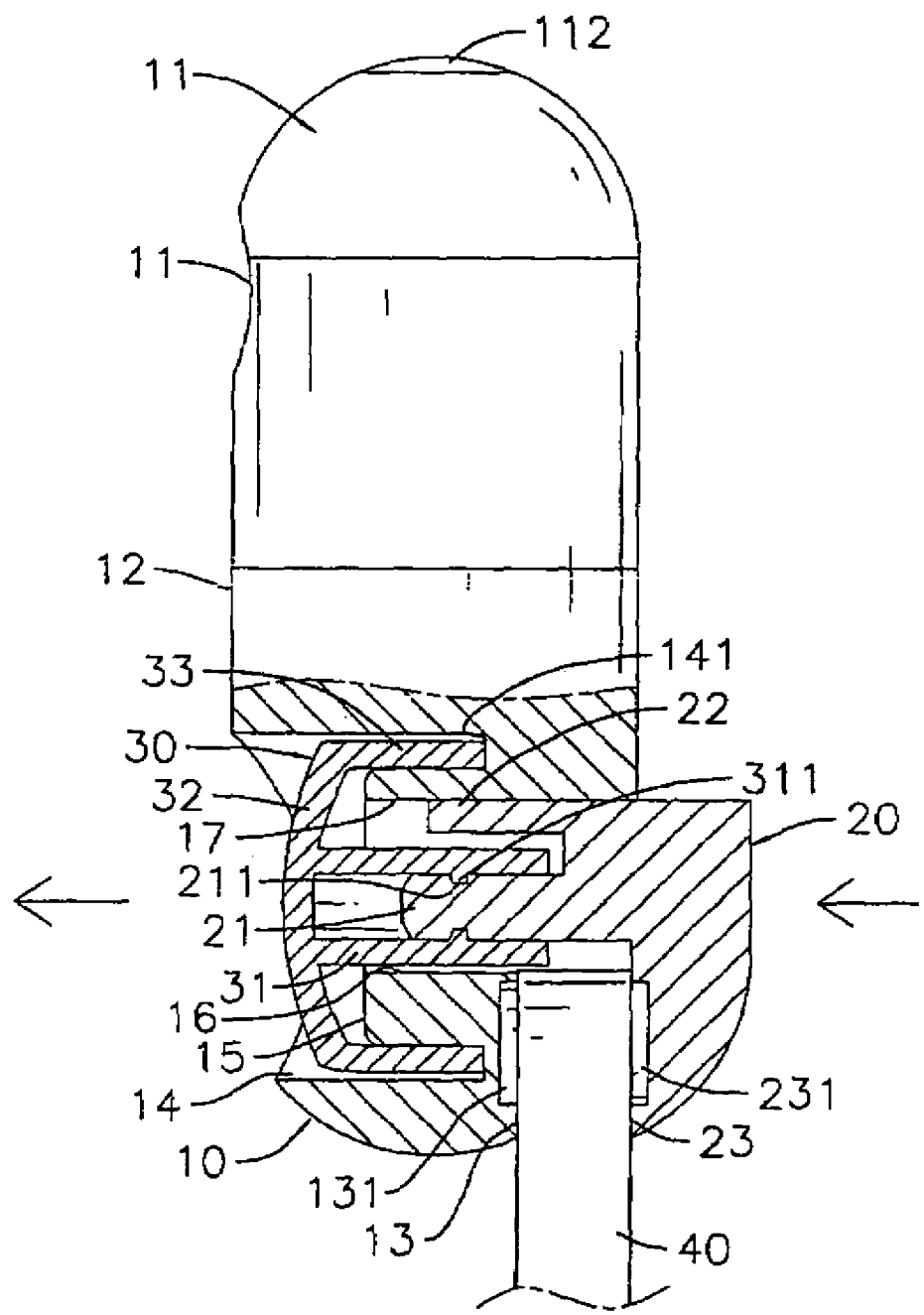
FIG. 6 is a sectional view of the preferred embodiment, in which the clamping mechanism in a restoring state.

Referring to FIG. 6, once the user releases the button 30, the restoring force generated by the dome 32 will force the clamping surface 23 and the clamping surface 13 to clamp the object 40 in a stable state. Different shapes of pads made of different materials may be positioned within the pad-receiving indentation 131 and pad-receiving indentation 231 to prevent scratching of the object 40, and/or to increase friction between the object or display and clamping surfaces 13 and 23.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A clamping mechanism for a computer peripheral device, comprising:
   a base having opposite first and second sides;
   a button mounted at the first side of the base, said button having a resilient and deformable dome on a top of the button, a relatively rigid skirt on a lower side of the button, and a first extension on an inside of the dome;
   a clamp positioned at the second side of the base, said clamp being coupled to said first extension;
   wherein the clamp has a first extension that extends into the base,
   wherein the button is coupled to the clamp via the first extension; and
   wherein the dome is resilient and deformable such that, when the dome is pressed, the dome deforms to cause the clamp to move away from the base to create a clamping space, and wherein a restoring force of the dome when pressing of the dome is released causes an object in the clamping space to be clamped between the clamp and the base.

2. The clamping mechanism for a computer peripheral device as claimed in claim 1, wherein the clamp has a second extension extending into the base for steadying the movement of the clamp.

3. The clamping mechanism for a computer peripheral device as claimed in claim 1, wherein the base has a recess for receiving the button.

4. The clamping mechanism for a computer peripheral device as claimed in claim 1, wherein the extension of the dome is a tube, and the first extension of the clamp is a post.

5. The clamping mechanism for a computer peripheral device as claimed in claim 4, wherein the tube has a rib, and the post has a groove, the rib fitting into the groove to secure the tube to the post.

* * * * *